(No Model.)
2 Sheets—Sheet 1.
R. W. ALLEN.
HILLING AND FERTILIZING MACHINE.
No. 296,102. Patented Apr. 1, 1884.
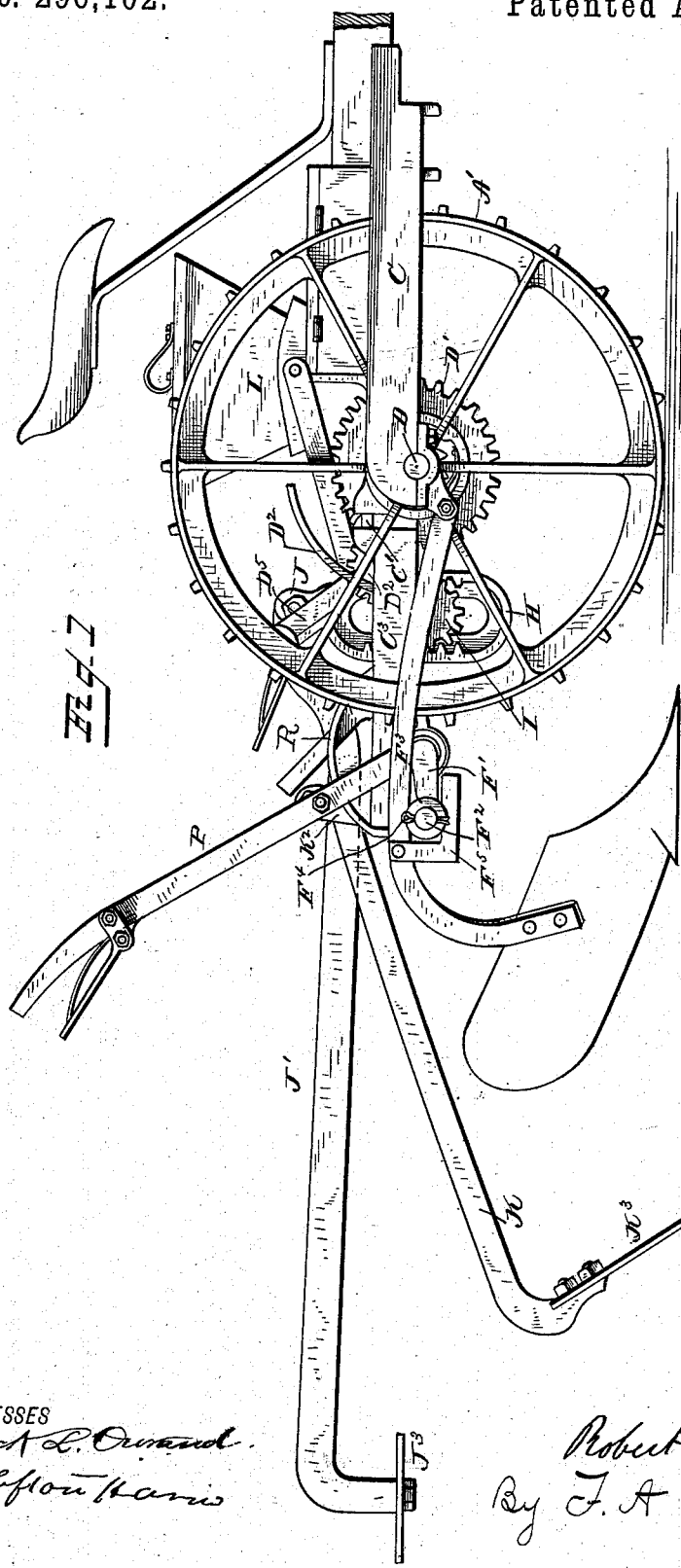

(No Model.) 2 Sheets—Sheet 2.
R. W. ALLEN.
HILLING AND FERTILIZING MACHINE.
No. 296,102. Patented Apr. 1, 1884.
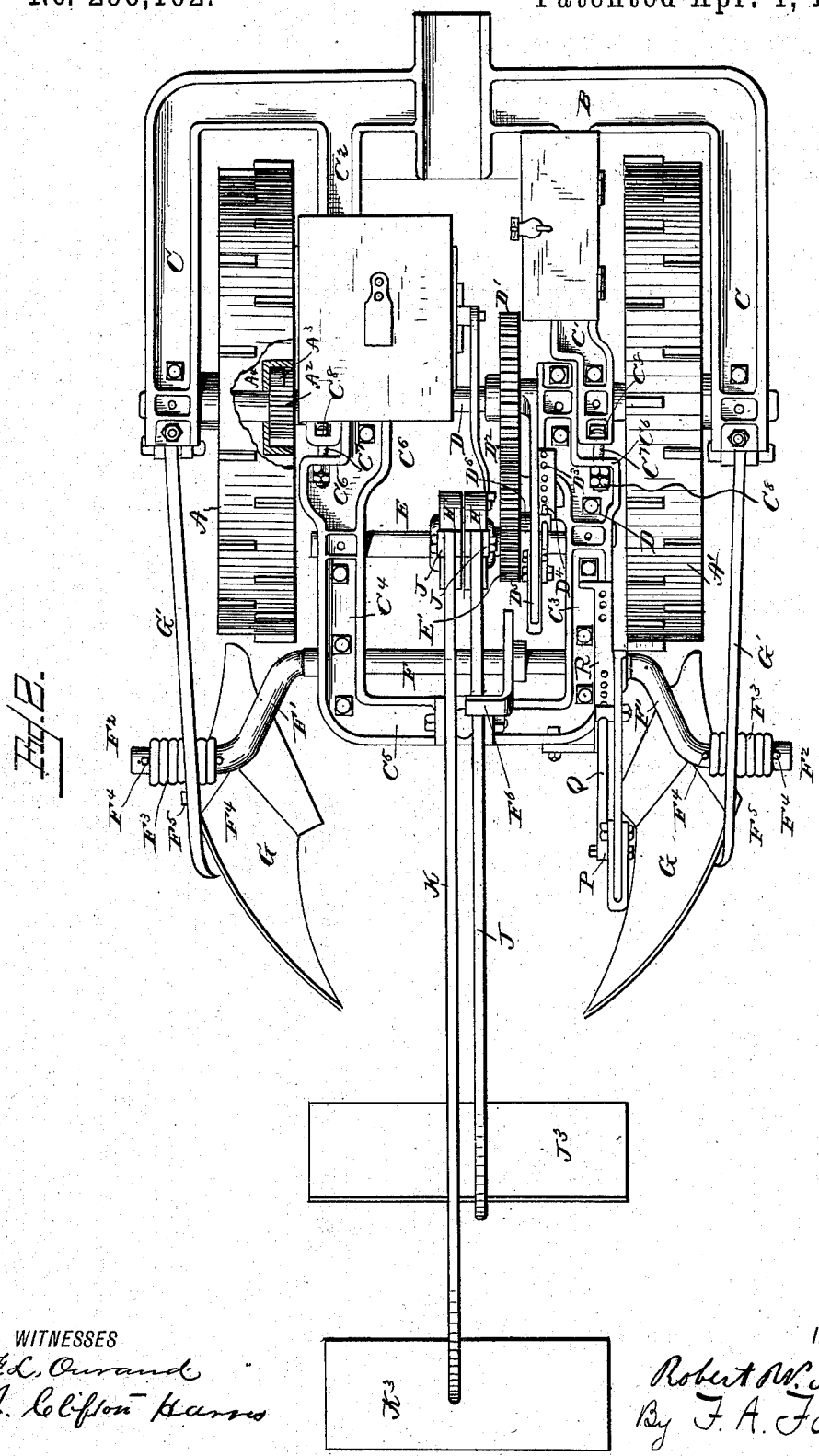
WITNESSES
INVENTOR
Robert W. Allen
By F. A. Fouts
Attorney

UNITED STATES PATENT OFFICE.

ROBERT W. ALLEN, OF NELLY'S FORD, VIRGINIA.

HILLING AND FERTILIZING MACHINE.

SPECIFICATION forming part of Letters Patent No. 296,102, dated April 1, 1884.

Application filed October 15, 1883. (No model.)

*To all whom it may concern:*

Be it known that I, ROBERT W. ALLEN, a citizen of the United States, residing at Nelly's Ford, in the county of Nelson and State of Virginia, have invented certain new and useful Improvements in Hilling and Fertilizing Machines, of which the following is a specification, reference being had therein to the accompanying drawings.

My invention relates to a hilling and fertilizing machine.

It consists in certain improvements on my invention patented in the United States March 27, 1883, and numbered 274,542. In said patent I have shown a V-shaped slatted block, $C^6$, at the engaging ends of the frame, whereby the lost motion (incident to wearing away of the ends) could be taken up by means of this block. In this application I substitute a lapped hinged frame, the engaging ends of said frame being provided with upwardly-projecting flanges having bolt-openings. Bolts threaded at both ends pass through these openings and secure the frame ends.

The second improvement lies in substituting washers for threads on the outer ends of the beam-lifting arms and providing said beam with a right-angled downwardly-projecting arm adapted to engage the beam and its lifting-arm. In my former patent referred to, the beams mashed the threads on the lifting arms by resting on and working over them. Again, instead of having the pawls on the outside of shaft-ratchet, I provide the wheel with a circular rim which encircles the shaft-ratchet, and inside of this rim I secure the pawl. By this means the pawl and ratchet are protected from the dirt that may fall from the main wheels. I also make a change in the rack-boxes by removing one side plate and placing an elliptical inner flange on the other side, all of which will be more fully hereinafter specified.

In the accompanying drawings, Figure 1 is a side elevation, and Fig. 2 a top plan view. Like letters indicate like parts in the views.

The letter A represents the left-hand wheel, and A' the right-hand wheel.

$A^2$ is a ratchet keyed to the main shaft.

$A^3$ is a pawl fixed to the inner side of the annular rim $A^4$. This rim is fixed to the inside of the main wheel, and shelters the ratchet and pawl from mud and dirt falling from the sides of said main wheel. When the wheels are moved forward, the pawls engage the ratchet and impart motion to the main shaft, and thence to the main cog-wheel, which is keyed on said shaft. When the machine is moved back, the pawls are disengaged from the ratchets, so that no power is communicated to the operating parts.

B is a cross-piece constituting the forward end of the frame.

C C are the forward outside pieces of the frame. C' is the right-hand inner frame-piece, and $C^2$ the corresponding piece of the frame on the opposite side.

$C^3$ and $C^4$ are rear side pieces, and $C^5$ the back cross-piece of the frame. The frame is made in two parts. The connecting parts are united near the center and secured by the main shaft, which passes through the lapped ends of the frame—that is to say, the frame is hinged over the main shaft. The frame-pieces are provided with upwardly-projecting flanges $C^6$.

$C^7$ $C^7$ are two bolts, one on each side, serving to unite the frame ends and draw them closer together as the parts become loose by wear. These bolts have threaded ends, and are secured by nuts $C^8$.

D represents the main shaft, and D' the cog keyed thereon. $D^2$ is a small cog worked on a pin, $D^6$, projecting from an arm or lever, $D^5$, which has a bearing on main shaft.

$D^3$ are openings in a curved frame. The arm $D^5$ is provided with a spring and catch, $D^4$, the latter engaging the openings $D^3$ and securing the arm in any desired position.

E is a cross-bar, having a bearing under the rear frame, $C^3$ $C^4$. To this cross-bar is rigidly secured the cog E'. By throwing the lever $D^5$ backward, the gearing $D^2$ and E' are engaged and power communicated through the main shaft D and cog D' to the several parts. By placing the lever $D^5$ in a vertical position, the cog $D^2$ is disengaged from cog E', and the several parts thereby thrown out of gear.

F indicates a cross-bar having a bearing under the rear ends of the frame-pieces $C^3$ and $C^4$. On either side of this cross-bar is a crank-arm, F', having an outer horizontal projection, $F^2$. This projection is provided with washers $F^3$.

$F^4$ are pins for securing the washers. $F^5$ is a right-angled arm on the plow-beam. This arms passes under the arm $F^2$, thereby securing the beam to the arm $F^2$. $F^6$ is a hooked arm rigidly united to cross-piece F. When the parts are thrown out of gear and the lever P thrown forward, the beams and plows are raised. The hooked arm $F^6$ is thereby thrown forward, the hook engaging and forcing down the forward end of the handle J. By this means, through the medium of the mutilated pinion and rack, the operator is enabled to cause the racks to lie together, and thereby elevate the rear ends of the handles sufficiently to prevent them from engaging the ground—that is to say, by throwing down the forward end of handle K, when it is raised, it will force its rack-bar down on the pinion, and the two racks will be caused to lie side by side, whereby the handles will be parallel and the rear ends thereof carried clear of the ground. By forcing down the forward ends of the handles, the rack-bars are also pressed downward and the hoes or hilling-boards $J^3$ and $K^3$ lifted and carried clear of the ground.

G G are the mold-boards, right and left, and G' G' the beams, hinged to the rear end of the frame C C.

H is the right-hand rack-frame, and H' the left-hand one.

I is a mutilated pinion keyed to cross-bar E. This pinion has teeth nearly half-way around, the other part being smooth. When the machine is in gear, the main shaft imparts power through the chain of gearing to the cross-bar E, and consequently the mutilated pinion I is revolved. A half-revolution of said pinion will suffice to engage the teeth on the inside of the rack-bar and move said bar downward. When the pinion has completed its downward movement, its teeth will engage the teeth in the rack on the opposite side of the casing and force the rack upward. The two racks H and H' are so adjusted on the shaft E that they are given an alternate reciprocating motion.

J J are lugs on the tops of racks H H'.

$J^3$ is a patting-hoe on the rear end of handle J'. The forward ends of the hoe-handles are pivoted to the lugs J on the rack-bars. K is the left-hand hoe-handle, pivoted to the lug J at its forward end and to the standard $K^2$ at the rear. The alternate reciprocating motion which is given to the rack-boxes H H' by the mutilated pinion is communicated to the hoe-handles J' and K. By this means a similar motion is imparted to the hoes or hilling-boards $K^3$ $J^3$. The hoe $K^3$, Fig. 1, forms the hills and gives to each a corresponding shape. It has a wave-like motion. The piece $J^3$, having the alternate motion, descends on each of the hills formed by hoe $K^3$ and pats or presses the same immediately on its top, thereby imparting shape to the hills. It will be seen that the hoes will operate in the center of the ridge thrown up by the shovels G G. The hopper is represented by the letter L.

P is a lever, having dog Q, that engages with teeth on the top of circular frame R. The bottom of this lever is rigidly fixed to the cross-piece F. By moving the lever forward the crank-arms F' F' on the cross-piece F are raised. By raising these arms the beams and plows attached are also raised. By lowering said arms the plows are lowered. It will thus be seen that the depth of the furrows can be regulated by the lever P. Thus a vertical adjustment is given the plows by the lever, while said plows and their beams are adjustable laterally on the arms $F^2$ $F^2$ by the washers $F^3$ $F^3$. By the foregoing means it must be apparent that the width and depth of the furrow can be adjusted to suit the convenience of the operator.

The fertilizing mechanism shown in my patent No. 274,542, is not illustrated herein.

In Fig. 2 of the drawings patting-boards are shown on the rear ends of the rocking arms. In Fig. 1 one of said arms is provided with a hoe, the other having a patting-board.

Having thus described my invention, I claim as new and desire to secure by Letters Patent—

1. The flanged frame-pieces C' $C^2$ $C^3$ $C^4$, having the lapped hinged ends, as specified, in combination with the bolts $C^7$ and nuts $C^8$, whereby the lapped ends of the frame are adjustable, substantially as described, and for the purpose set forth.

2. The lifting-crank arms F' $F^2$, washers $F^3$, and means whereby the washers may be secured, in combination with the beam G' and right-angled arm $F^5$, substantially as described, and for the purpose set forth.

3. The boxes H H', provided with two side parallel toothed racks, said boxes being open on one side and provided on the other with an inner annular flange, in combination with a mutilated pinion, substantially as described, and for the purpose set forth.

In testimony whereof I affix my signature in presence of two witnesses.

ROBERT W. ALLEN.

Witnesses:
J. CLIFTON HARRIS,
INDIA B. HAYS.